United States Patent
Lin

(10) Patent No.: US 6,167,635 B1
(45) Date of Patent: Jan. 2, 2001

(54) PUSHING SUSPENDING DEVICE OF A MEASURING TAPE

(75) Inventor: Henry Lin, Taipei (TW)

(73) Assignee: Index Measuring Tape Co., Ltd., Taipei (TW)

(*) Notice: Under 35 U.S.C. 154(b), the term of this patent shall be extended for 0 days.

(21) Appl. No.: 09/188,337

(22) Filed: Nov. 9, 1998

(51) Int. Cl.[7] .................................................. G01B 3/10
(52) U.S. Cl. .............................................. 33/767; 33/755
(58) Field of Search ........................... 33/767, 755, 761, 33/768, 769, 770

(56) References Cited

U.S. PATENT DOCUMENTS

| | | | |
|---|---|---|---|
| 5,395,069 | * | 3/1995 | Chen .................................... 33/767 |
| 5,657,551 | * | 8/1997 | Lin ....................................... 33/767 |
| 6,026,585 | * | 2/2000 | Li ......................................... 33/767 |
| 6,032,380 | * | 3/2000 | Li ......................................... 33/767 |

* cited by examiner

Primary Examiner—Christopher W. Fulton
(74) Attorney, Agent, or Firm—Dougherty & Troxell

(57) ABSTRACT

A pushing suspending device of a measuring tape has a housing, a rule and a suspending device, with the rule curled within the housing, and protecting disk covers installed on the two sides of the rule. The suspending device includes a contacting pressing piece and a suspending switch. One end of the contacting pressing piece is embedded within the housing, and another end of which is formed with a cambered contacting plate. A pushing key is projected upwards from the center of the plate. An opening is located on the lower end of the housing to accommodate the suspending switch. The front end of suspending switch has a through hole for the rule, while the two sides have resisting portions for resisting against the protecting disk covers. When the rule is pulled, if the suspending switch is pushed, then the movement of the rule may be suspended effectively.

3 Claims, 5 Drawing Sheets

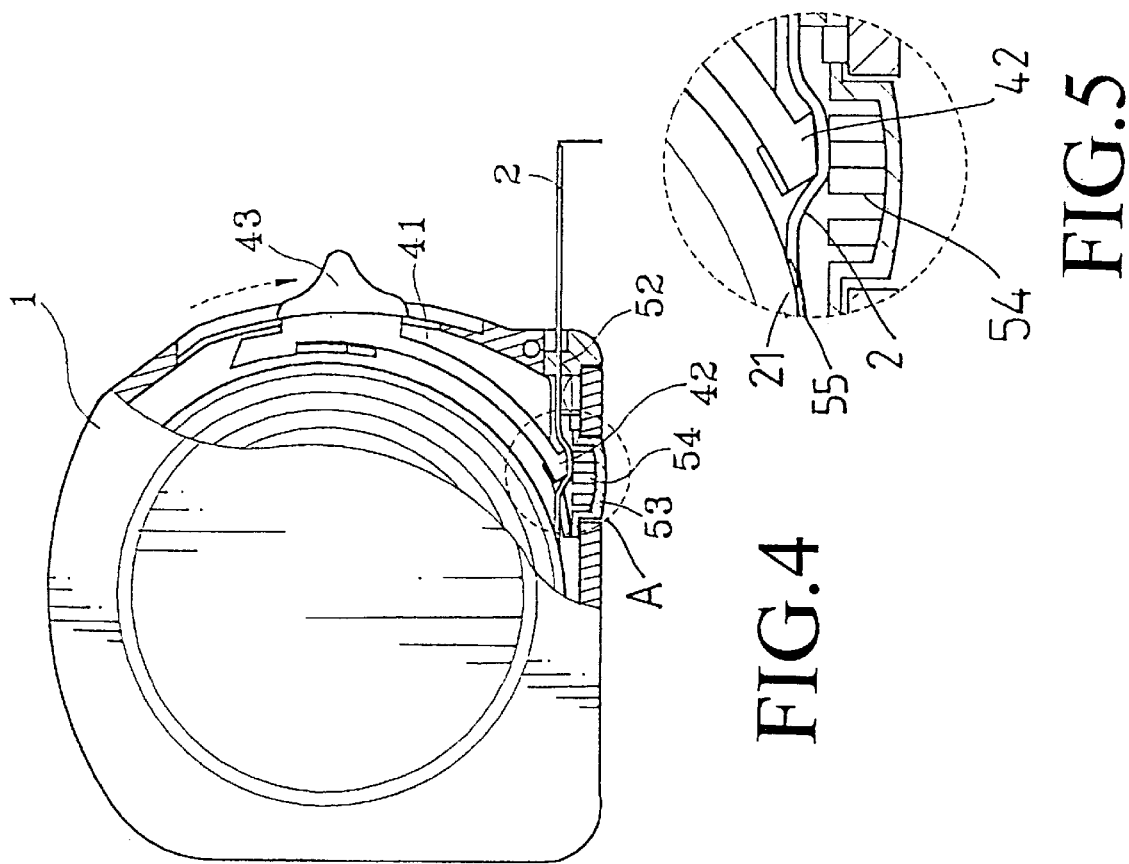

PUSHING SUSPENDING DEVICE OF A MEASURING TAPE

BACKGROUND OF THE INVENTION

1. Field of the Invention

The present invention relates to a pushing suspending device of a measuring tape, and especially to a suspending device which may suspend the action effectively.

2. Description of the Prior Art

A prior art rule shown in FIG. 6 only has a locking switch 101 above the housing 100. Generally, it is necessary for the user to resist against the lower surface of the rule 200 so to lock the rule 200 with the locking switch 101. But this design has the following disadvantages:

1. Since the suspending action is performed by fingers pushing against the lower end of the rule, the rule surface is pressed so that the measurement cannot be performed accurately.
2. The edge of the rule may easily harm the fingers to cause a dangerous accident.
3. To press the rim of rule will destroy the rule.

In order to improve the aforementioned defects, the inventor of the present invention has made a great effort and has made many novel designs.

SUMMARY OF THE INVENTION

Accordingly, the object of the present invention is to provide a pushing suspending device of a measuring tape which is actuated by a contact pressing piece and a suspending switch. Thus, the rule may conveniently and effectively be controlled.

Another object of the present invention is that in the pushing suspending device of a measuring tape, top resisting portions are installed on two sides of the suspending switch. When the rule has extended to a predetermined distance, the suspending switch is pressed downwards so that the resisting portions will resist against the cover rim of the protecting disk covering two sides of the rule. Therefore, the curling of the rule is further controlled.

A further object of the present invention is to provide a pushing suspending device of a measuring tape in which multiple banks of grooves are installed on the suspending switch so that when the contacting pressing piece slides downwards to the contacting block to press the rule, it may further be embedded into the banks of grooves.

The present invention will be better understood and its numerous objects and advantages will become apparent to those skilled in the art by referencing to the following drawings in which:

BRIEF DESCRIPTION OF THE DRAWINGS

FIG. 4 is a cross-sectional view of the present invention with the suspending device activated.

FIG. 5 is an enlarged view of portion A of FIG. 4.

DETAILED DESCRIPTION OF THE PREFERRED EMBODIMENT

Figure 1:
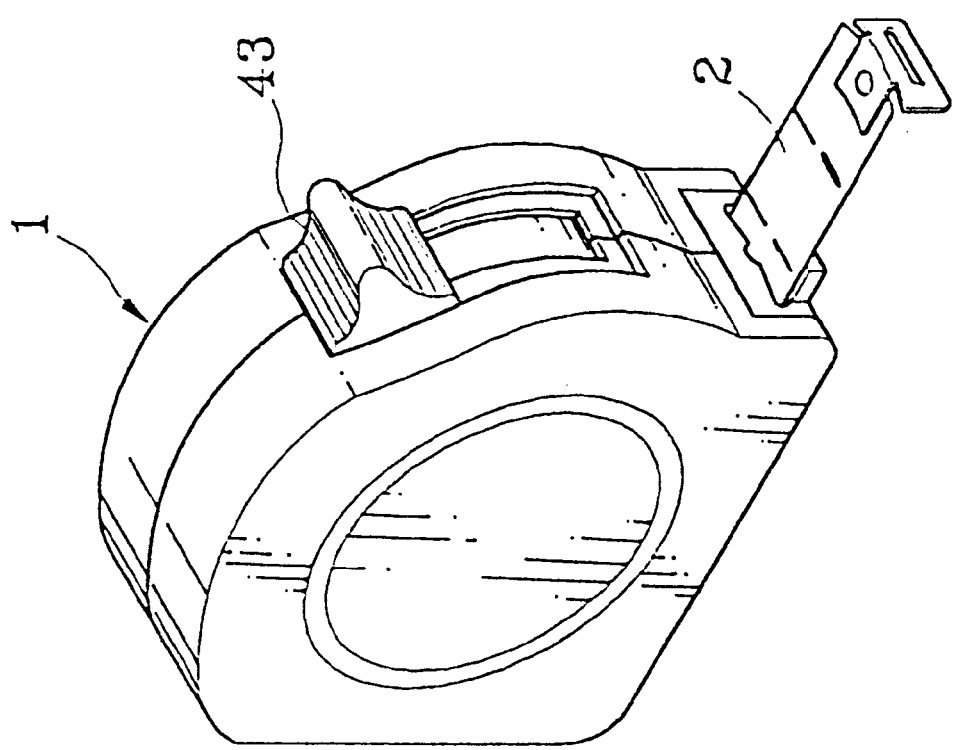
FIG. 1 is a perspective view of the present invention.

As shown in FIG. 1, the pushing suspending device of a measuring tape in the present invention comprises a housing 1, a scrollable rule 2 and a suspending device 3. Protecting disk covers 21 and 22 are installed on the two sides of the rule 2. The protecting disk covers 21 and 22 are formed integrally with the scrolling shaft penetrating through the center of the rule 2. The structure for the interior of the housing 1 containing the rule 2 is well known in the art, thus the details thereof will not be described herein. In the following, the pushing suspending device of the present invention will be described referring to the related figures.

Figure 2:
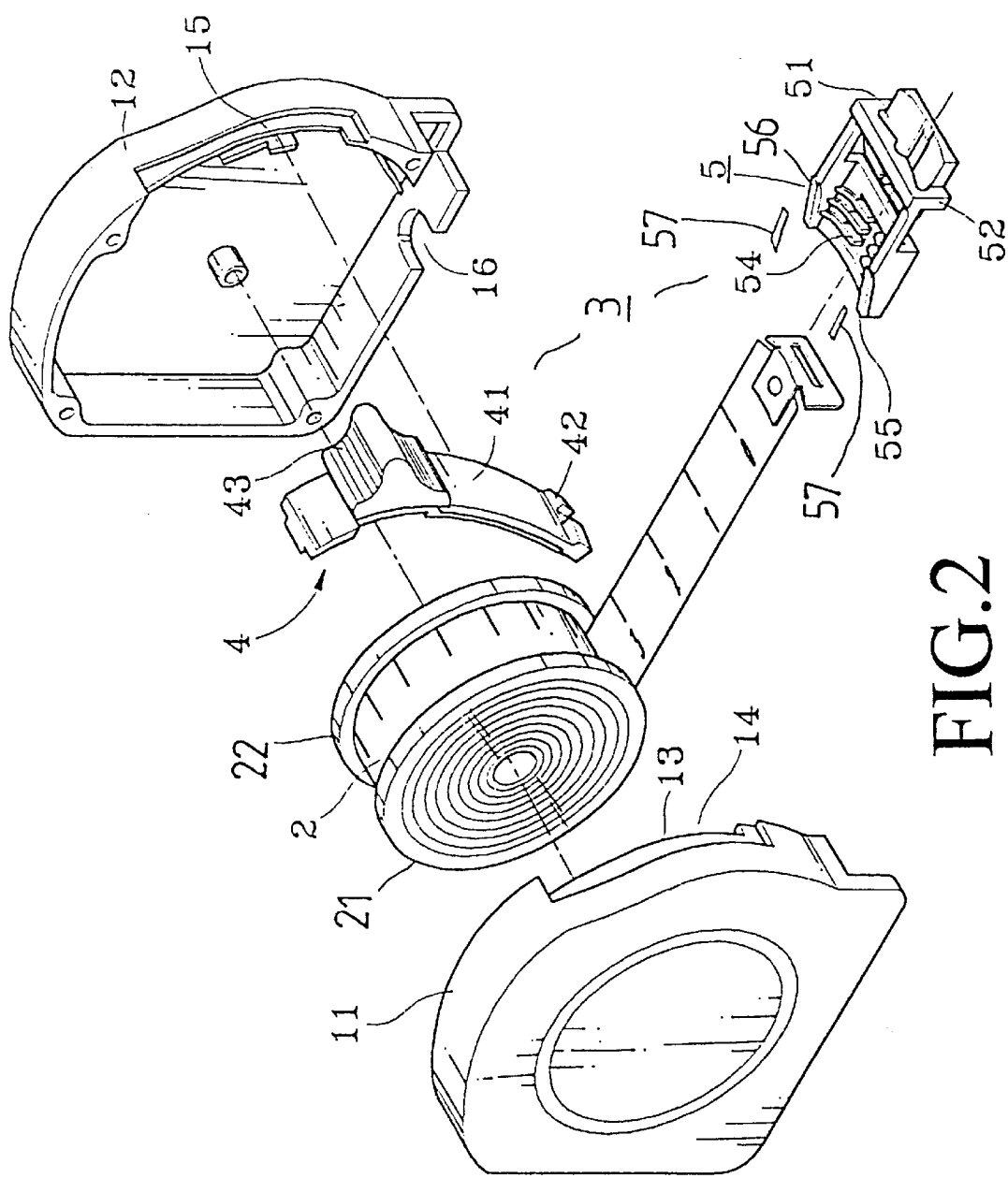
FIG. 2 is a partial exploded view of the rule according to the present invention.
Figure 3:
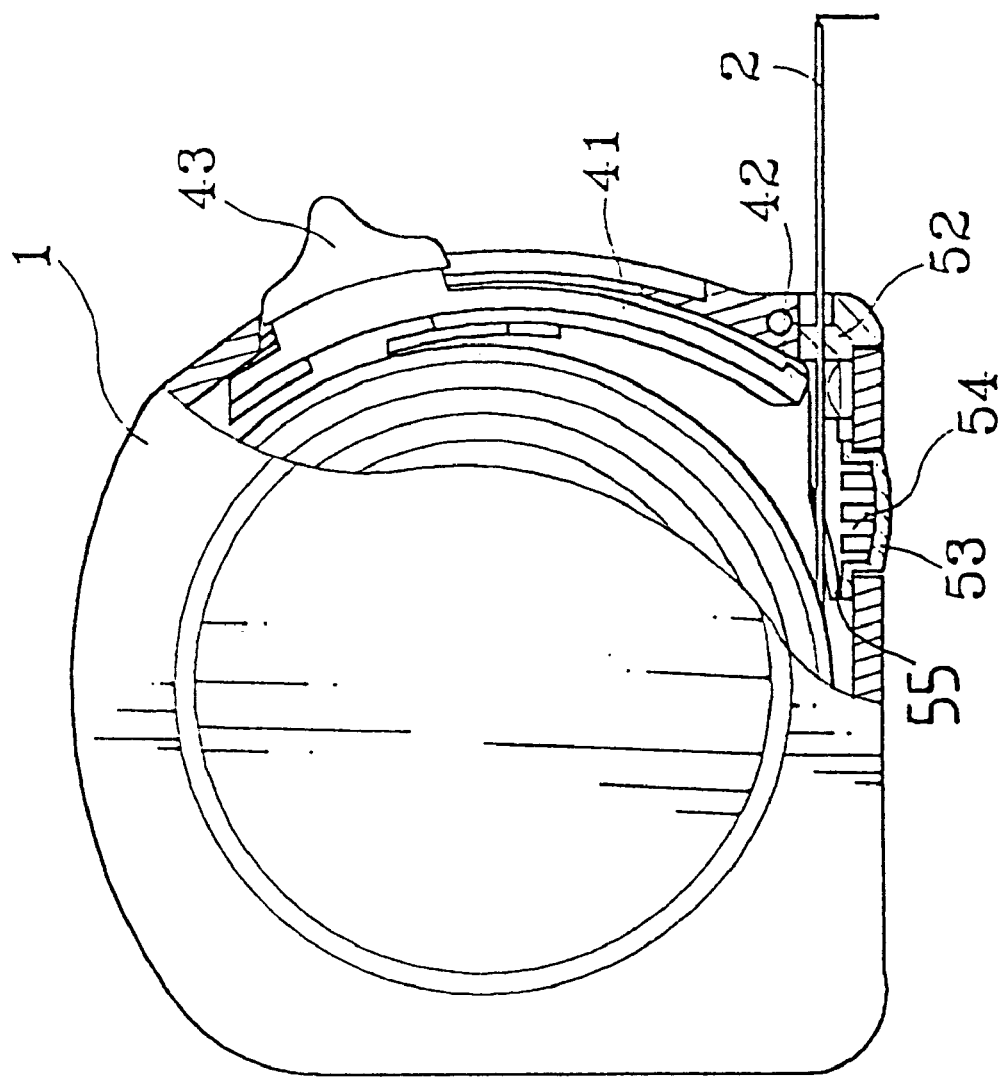
FIG. 3 is a cross-sectional view showing the present invention with the suspending device released.
Figure 6:
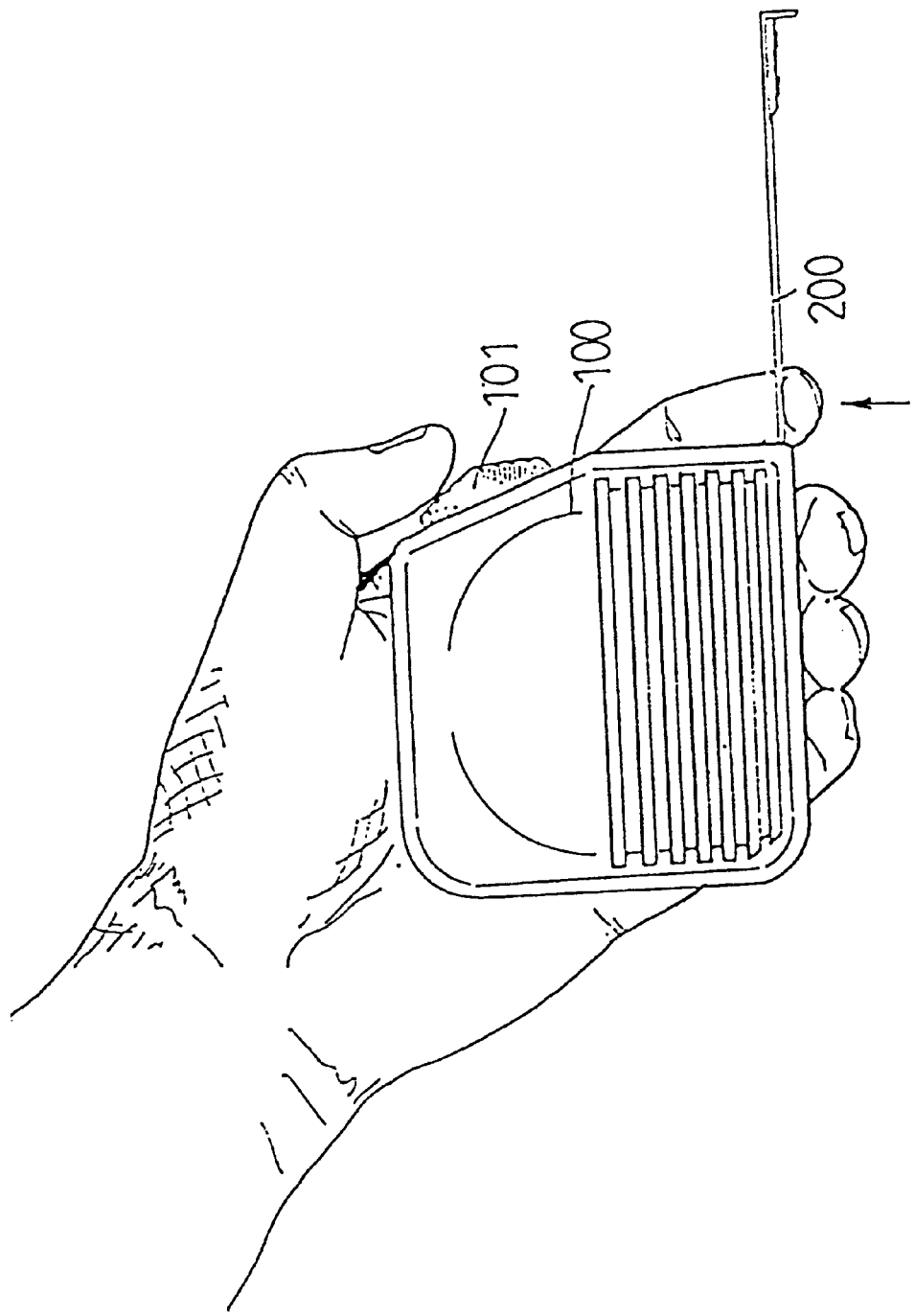
FIG. 6 shows a suspending device for a rule of the prior art.

Referring now to FIGS. 2 and 3, the housing 1 includes a left housing 11 and a right housing 12. The front end of the housing is formed with a switch guiding portion 13, the middle thereof is formed with a cambered opening 14 for containing a contact pressing piece 4, and the inner portion thereof is installed with a guiding piece 15 for guiding the movement of the contact pressing piece 4.

The suspending device 3 further includes a suspending switch 5. The contact pressing piece 4 has a plate 41 the distal end of which has projected contacting block 42 and the upper end of which has a pushing key 43. The plate 41, with the pressing key, contacts the guiding piece 15 of the housing for sliding. The suspending switch 5 is an element formed by a plastic material. Above the front end thereof is a cambered through hole 51 for being penetrated through by the rule 2 so that the rule 2 may move. Below the front end of the suspending switch is a hook 52 for returning the switch 5 to the housing in a predetermined position. A concave portion 53 projects downwardly from the rear end of the suspending switch 5. The concave portion 53 may extend into the opening 16 on the lower end of the housing. Multiple banks of the grooves 54 are formed on the upper surface of the concave portion 53. Also, top resisting portions 55 and 56 are formed on the upper ends of the two sides of the suspending switch 5. The top resisting portions 55 and 56 have a cambered shape and stoppers 57 are formed on the upper ends thereof so that as the suspending switch 5 moves upwards, they will press against the protecting disk covers 21 and 22.

In the operation of the present invention, as shown in FIGS. 4 and 5, when the rule 2 is pulled outwards, it will pass through the through hole 51, thus it may move steadily. If it is desirable to suspend movement of the rule 2, the user may still hold the housing, meanwhile, the fingers hold and press the concave portion 53 of the suspending switch 5. Therefore, the suspending switch 5 will move upwards by the applied force of the fingers. After the suspending switch has moved upwards for a distance, the cambered resisted portions 55 and 56 of the distal end thereof will press the protecting disk covers 21 and 22. Thus, the object of suspending movement of the rule 2 is achieved.

Accordingly, from the aforementioned description, the pushing suspending device of a measuring tape in the present invention certainly has the effect of sustaining the rule in a steady condition. Although the present invention has been described using a specified embodiment, the examples are meant to be illustrative and not restrictive. It is clear that many other variations would be possible without departing from the basic approach, demonstrated in the present invention.

What is claimed is:

1. A pushing suspending device for a measuring tape having a housing, a rule and a suspending device, the rule being curled within the housing, protecting disk covers being installed on two sides of the rule and being integrally formed with a scrolling shaft penetrating through the center of the wound rule, the pushing suspending device comprising: a contact pressing piece and a suspending switch, the suspending switch being installed on a lower portion of the housing, the end of the suspending switch having a projected concave portion, a front end of the suspending switch having a through hole for being penetrated by the rule, the two sides of the suspending switch having resisting portions, multiple banks of grooves being formed on a surface of the concave portion of the suspending switch; and, a contact pressing piece installed within the housing having a contacting plate, a lower end of the contacting plate having a contact block, and a pushing key extending from the contacting plate, thereby, when it is desired to suspend movement of the rule, the concave portion on the suspending switch is pressed inwards so as to move the top resist portions tightly against the protecting disk covers to stop the action of scrolling the rule.

2. The pushing suspending device of a measuring tape as claimed in claim 1, wherein the through hole on the front end of the suspending switch has a concave cambered configuration matching a shape of the rule.

3. The pushing suspending device of a measuring tape as claimed in claim 1, wherein the resisting portions of the suspending switch have a concave cambered configuration with upper ends thereof having stoppers thereon.

* * * * *